United States Patent [19]

Ibanez Palomeque et al.

[11] Patent Number: 5,233,647
[45] Date of Patent: Aug. 3, 1993

[54] SYSTEM FOR OPERATING PUBLIC MODULAR TELEPHONES

[75] Inventors: Francisco Ibanez Palomeque; Jose Mir Ceprià, both of Madrid, Spain

[73] Assignee: Telefonica de Espana, Madrid, Spain

[21] Appl. No.: 733,144

[22] Filed: Jul. 19, 1991

[30] Foreign Application Priority Data

Jul. 27, 1990 [ES] Spain .................................. 9002024

[51] Int. Cl.$^5$ .................. H04M 15/00; H04M 17/00; H04M 7/00
[52] U.S. Cl. .................................. 379/112; 379/123; 379/222
[58] Field of Search ............... 379/111, 112, 114, 122, 379/123, 143, 144, 154, 222

[56] References Cited

U.S. PATENT DOCUMENTS 4,517,412  5/1985  Newkirk et al. .................. 379/123
5,065,393 11/1991  Sibbitt et al. .................. 379/112 X Primary Examiner—Stafford D. Schreyer
Attorney, Agent, or Firm—Mason Fenwick & Lawrence

[57] ABSTRACT

The systems consists of an intrinsic collaboration among a message concentrator unit, a center operating unit, several visual displays, printers, information storage devices including operating and management software, insuring that modular telephones and both validation and identification units and access units control together with regional billing centers and a validation and billing center, as well as terminals of collecting entities by interchanging diverse specific operating messages within the public modular telephone management system-the whole context and operation arisen from their performance.

5 Claims, 1 Drawing Sheet

SYSTEM FOR OPERATING PUBLIC MODULAR TELEPHONES

OBJECT OF THE INVENTION

This inventions relates to a system for operating public modular telephones, the obvious purpose of which is to carry out a programming, supervision and control, both of telephones and the remaining equipment and systems composing the public modular telephone management system.

FIELD OF THE INVENTION

This invention has it application in the telecommunications field, specifically as a part of the necessary substructure for a correct operation of the new public telephone service, which allows to carry out calls by using diverse payment modes.

PRIOR ART

It is known the existence of an invention patent relative to a modular telephone applied for on behalf of the COMPAÑÍA TELEFÓNICA DE ESPAÑA, S.A.

The above-mentioned modular telephones are telephones for public use with an intelligent nature, accepting as payment for their utilization coins, prepayment cards and credit cards.

In order to carry out the connection of modular telephones to a modulated telephone network, a patent of invention was asked for in due time covering a validation and identification unit having as a definite mission to identify and authorize the connection of modular telephones to a switched telephone network, validating or not call requests to be used by the credit cards as means of payment.

Also, it is known the existence of a patent of invention covering a modular telephone adapting unit having as task to validate the credit transactions of modular telephones which are not connected to validation and identification units.

Nevertheless, in all the context relative to several systems and devices to attain a perfect harmonic operation of public modular telephones, no system covering the operation thereof is contemplated.

At present, there are different equipment operating systems or already known systems which cannot be applied to this type of modular public telephones, as these are fitted with a special idiosyncrasy putting them notably aside from the traditional operating systems.

An evident solution to this problem would be to dispose of a system for operating public modular telephones able of being fully and positively integrated within the modular telephone management system and endowed with special features suitable to the equipment novelty and holding a harmonic collaboration with the remaining units and systems as used up to date to carry out the several functions to be applied in order to obtain a total operation of the public modular telephones connected to a switched telephone network.

Until now, there is no system envisaged as adequate.

DESCRIPTION OF THE INVENTION

The system for operating public modular telephones constitutes itself an evident solution to the present problems to carry out one of the complementary functions within the different services and operations to be fulfilled in order that the modular telephones connected to a switched telephone network fulfill adequately their task.

More specifically, the system for operating public modular telephones of this invention is that assigned, at a professional level, to centralize the alarm reports emitted by modular telephones, validation and identification units, as well as modular telephone adaptation units.

Likewise, the system for operating public modular telephones is that assigned to generate failure and repair reports, as well as statistical reports and, at the same time, to teleprogram modular telephones, validation and identification units and modular telephones adapting units.

In a more synthesized manner, the system for operating public modular telephones (SETM) is an element allowing to program, supervise and control both modular telephones and validation units and access units composing the modular telephone management system.

At the same time, the system for operating public modular telephones allows to obtain statistical information of the data contained in its data base in order to know the plant state, its composition, service quality and terminal reliability, sent traffic and obtained receipts.

The system for operating public modular telephones is constituted by two fundamental elements:

A. The message concentrator unit (UCM).
B. The center operating unit (UCEX)

The message concentrator unit (UCM) acts as the front-end of communications for the center unit, being able to allow several simultaneous communications via the switched telephone network with the system elements.

The center operating unit (UCEX) has two printer terminals for the system operator, as well as several display terminals for senders, UCEX being fitted with hard hypodisk storage devices for a quick access and also with tape type for a mass storage at long-term.

This system for operating public modular telephones communicates with modular telephones, validation and identification units and modular telephone adaptation units, in order to carry out their maintenance and control, but, in turn, it also communicates with regional billing centers (CRF) and (CVF), in any case.

The system for operating public modular telephones carries out the following operative steps:

Modular telephone (TM) communicates with the public modular telephone operation service through the validation and identification unit, if any, and if it doesn't exist, it shall direct communicate on the following assumptions:

When an alarm (TA message) is detected, it is sent when passing the modular telephone on the hanged position for a definitive period of time after producing the alarm.

Alarms can be sent together with the collection message.

Collection message (TE message) is sent, this being sent when completing the collection process.

If there are alarms, both the previous ones not sent, and the inserted ones entered via keyboard at the collection time, they will be sent as an alarm message following the TE message.

A telephone is being installed (TI message), this being sent as an attendant's initiative.

All statistics and alarms are deleted, and the system for operating public modular telephones answers with the parameter programming TP message.

A telephone is being repaired (TB), it is sent per attendant' initiative.

Statistics are not deleted, but it does the alarms, and the service for operating public modular telephones answers with the parameters programming TP message.

Parameters are recalled (TX message), this message is sent when the modular telephone passes on to the hanged up position for a definitive period of time, after detecting an error in the parameters. The service for operating public modular telephones answers with the parameters programming TP message.

A modular telephone is ceased (TH message), included the service for operating public modular telephone, these data shown in the general statistics of that telephone as if it were a daily routine message.

From this moment on, the modular telephone has ceased and the message is sent at attendant's initiative, by using always for it, said messages with a standardized communication protocol.

The validation and identification unit is fitted with a terminal for entering basic data which allow to accede the service for operating public modular telephones, this service being able to dump all the operating parameters.

From that moment on, the validation and identification unit is ready to carry out its functions. On sending its daily routine message, the validation and identification unit sends that of all the modular telephones connected to it.

The validation and identification unit makes a pick up through its external line in order to get a tone inviting to dial.

When the tone has been detected, the validation and identification unit dials automatically the telephone number, this number corresponding to the number having access to the system for operating public modular telephones, in order to get a connection once the carrier tone has been obtained.

The adaptation units of public modular telephones (UATM) are fitted with a terminal for entering base data allowing to accede the system for operating public modular telephones, and the load by this system, of the operating parameters of the adaptation unit of modular telephones, with which the UATM is ready to carry out its functioning.

The adaptation unit of modular telephones produces a pick up by its external line to get a tone inviting to dial, and when detecting this tone, the own unit effects automatically the dialing of the access number to the system for operating public modular telephones in order to get a connection when the carrier tone has been obtained.

The system for operating public modular telephones in question carries out among other functions of maintenance and control of modular telephones, validation and identification unit and adaptation unit of modular telephones, the following:

Entries and cessations at the data base.
Parameter teleprogramming.
Alarm reception.
Franking and cessation reception.
Daily routine reception.
Collection reception.
Initialization messages.
Prompt visualization messages.
Other messages.
Local functions.
Plant maintenance.
Modification of parameter tables.
Plant management.

Entries and cessations at the database are used for the normal functioning of the system for operating public modular telephones, there being a database corresponding to modular telephones, validation and identification units, access units and parameter tables related to each terminal.

The parameter teleprogramming is based on the existence of a series of parameters which are remote programmed by means of sending TP/UP/VP messages, depending on whether it concerns to a modular telephone, a validation and identification unit or an adaptation unit of modular telephones.

The alarm reception function is carried out due to the fact that the service for operating public modular telephones is ready to receive alarm messages from all the terminals assigned to it, it being also qualified to carry out the filtering of said messages so that a same alarm from a same terminal shall be ignored in order to avoid more than one warning on the screens of senders.

The alarm messages are stored in a memory to create a failure record.

The franking and cessation reception function is carried out when a terminal is repaired and when the repairing operation itself has been completed, a franking message with identification of the repaired failures is sent.

The franking codes refer to six subdivisions of existing ways in the system for operating public modular telephones.

If it is not possible to repair a modular telephone, a cessation message is sent including all the stored statistical data which are sent as a daily routine.

The daily routine reception is made on the basis that the modular telephone send daily a message with the traffic daily sent.

The service for operating public modular telephones send the collection data and the filling level of the modular telephone moneybox to the collecting entity.

Also, the traffic and collection data are treated to be sent to regional billing centers or, in absence of these, to the validation and billing center having as a task to validate, at a national level, the credit cards, to keep black and grey lists of said cards, carrying out a communication with the card editing centers.

The collection reception function is effected each time that the moneybox containing the collection of a modular telephone defined as of own property is withdrawn, and a collection message is received in the service for operating public modular telephone, zeroing the parameters related to the message.

The initialization messages are effected when an equipment of the system for operating public modular telephones is installed, putting itself in communication with the service in question in order to send all the teleprogrammable parameters.

If the request is made by a validation and identification unit, the service for operating public modular telephones send the parameters related to that validation and identification unit.

The prompt visualization messages are made in reply to certain modular telephone messages, the sending of which requires an operator to be present, in which case the service for operating public modular telephones can answer with a prompt visualization message which is visualized on the display of the modular telephone or the terminal of the validation and identification unit, as required.

Likewise, from the service for operating public modular telephones and per operator's or sender's initiative, it is possible to ask a validation and identification unit for the activity state of a particular telephone, and in reply to this message the validation and identification unit answers with the time when the modular telephone made the last call.

Also, if the validation and identification locates an intent of fraud due to the utilization of a line by equipments foreign to the system, it disables the line as regard subsequent calls, and send an alarm message to the service for the operation of public modular telephones, with which it may be concluded easily that from the service in question it is possible to send messages other than those refering to a prompt initialization and visualization.

Also, to carry out local functions, the console operator can carry out all the functions as foreseen in the system for operating public modular telephones, included those specific of senders, among which are included to enter or ceasse different terminals, to modify parameters, to create failure forms, to carry out frankings, to obtain listings and statistics.

As regard the senders, these can visualize failures pending per zones, their presentation being made in the order assigned to the modular telephones within the zone.

Also, a sender can communicate by sending messages through the attendant.

To effect the plant maintenance, entries, cessations and modification of elements on the plant are allowed, by inserting all the necessary parameters for a correct functioning.

Likewise, the situation of a plant element can be visualized with all its parameters and present activity.

In order to carry out the parameter table modification, that, it is well known, said tables are different according to the plant element in question, the modular telephone has incorporated a table for programming billing parameters, collection, coins, cards, telephone numbers, frauds and sundry.

Both the validation and identification unit and the adaptation unit of modular telephones have associated three tables for programming parameters of telephone numbers, numbers of IBERPAC network and hours of daily routine.

The system for operating public modular telephones informs by means of a failure report in the case of not being it possible to carry out the programming of a parameter of a particular element.

Also, it is permitted to teleprogram the date of coming into force the change of parameters carried out.

Lastly, the system as above-mentioned, carries out the plant management that, within it, the system allows several options, such as inventory of plant, failure management, collection managements, traffic reports, availability reports and quality of service.

DESCRIPTION OF DRAWINGS

To complement the present description and to aid to a better understanding of the features of the invention, attached to this specification is a drawing sheet where, with an illustrative and non-limitative mode, it is shown.

PREFERRED EMBODIMENT OF THE INVENTION

Figure 1:
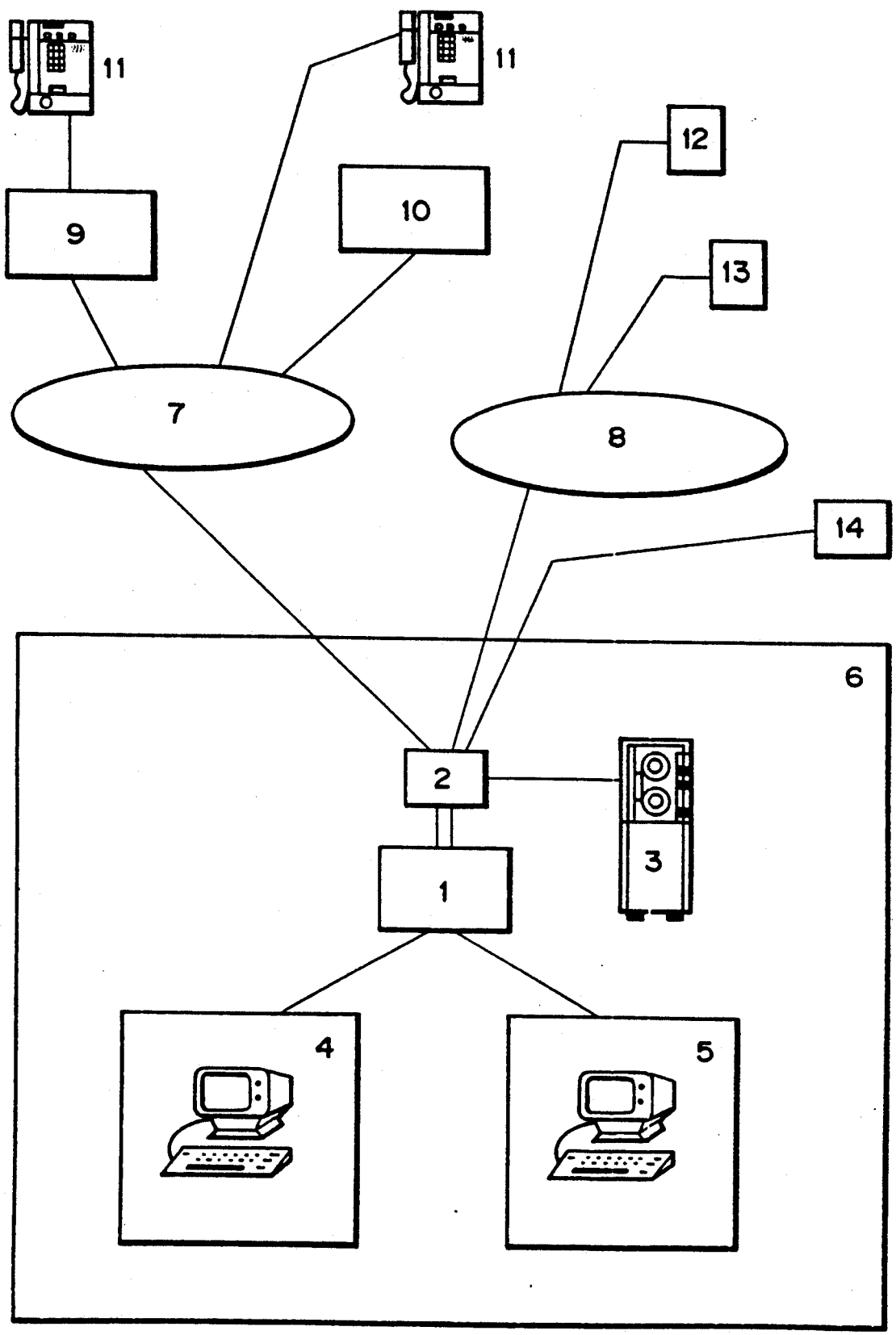
FIG. 1 only, showing a block diagram of the system for operating modular public telephones with a general view of the functional units composing it.

In view of the above comments and descriptions, and in accordance with the explanation of FIG. 1, the above mentioned functions involve a high complexity of the implemented software, as well as an efficient control of communications, both through a switched telephone network and the IBERPAC network.

Within the operating system (6), it is shown the center operating unit (1), the message concentrating unit (2), fitted with information storage devices (3).

Number 4 refers to the operator's console, while number 5 refers to the sender's zone.

The message concentrating unit (2) is, in turn, communicated through the switched telephone network (7) with the validation and identification unit (9) and the access unit (10).

Through IBERPAC (8), the message concentrating unit (2) realizes its communication with the regional billing center (12) and the validation and billing center (13).

Likewise, the message concentrating unit (2) is communicated, by means of a line dedicated to this end, with the terminals of the collecting entities (14).

In the figure, number (11) refers to modular telephones.

The messages involved in these functions of the system for operating public modular telephones, as well as the punctual data of some of the management functions allowed by the system itself, are as follows:

Entry of a modular telephone.
Entry of a validation and identification unit.
Entry of an access unit.
Cessations in the database.
Teleprogramming of modular telephone parameters.

The parameters sent to the modular telephone to be programmed are in a type "TP" message, the structure of which, with the parameters sent, is as follows:

Heading
Code of parameter message
Modular telephone identification.
Date of parameter sending.
Effective date of teleprogramming.
Modular telephone title.
General failure threshold.
Price of the step.
Short-distance call rate.
Short-distance call period.
Min. short-distance call balance.
Min. S.E. balance.
Min. short-distance call balance.
Min. long-distance balance.
Min. international call balance.
Cancellation of currency.
Cancellation of international currency.
Time without provincial rate.
Time without long-distance call rate.
Time without international call rate.
Numbers forbidden.
Numbers free of charge.
Numbers of access to operators.
Numbers of access to service of operating public modular telephone.
Number of access to the adaptation unit of modular telephones.
Number for opening the lock.
Official change of time.

Collection timetable.
Daily routine timetable.
Timings.
Types of coins.
Types of cards.
Black list.
Language
End of message
Longitudinal perity.

Likewise, the system allow to teleprogram parameters of the validation and identification unit, as well as to teleprogram parameters of the access unit.

To effect the alarm reception from a modular telephone, all alarm messages from modular telephones are identified by code "TA", this message being of variable length and containing all the alarms pending of communication by a telephone when a communication with the service for operating public modular telephones is established.

The alarm receiving structure of a modular telephone consists of the following alarms:
Heading.
Code of alarm message.
Modular telephone identification.
Number of message.
Date of sending.
Failures in general (among which: microset breakage, permanent counting frequency, absence of counting pulses, lack of earth (grounding), upper door opened, lower door opened, counting frequency deflected 10%).
Card failure (among which: card collection failure, card reader failure, card reader blockage).
Coin failure (such as: coin collection failure, validator failure, intermediate storage failure).
Incidents at the moneybox (such as: full moneybox, no moneybox, ¼ moneybox, moneybox stolen, moneybox cable fallen).
Incidents in general (such as premature replacements, voltage incorrect, clock failure, real time, intent of fraud, counting frequency deflected 3%, fradulent collection, collector's notice, identification failure).
End of message.
Longitudinal parity.
Alarm reception from a validation and identification unit.
Alarm reception from an access unit.
Franking reception from a modular telephone.
Franking reception from a validation and identification unit.
Franking reception from an access unit.
Cessation of modular telephone.
Cessation of the validation and identification unit.
Cessation of the access unit.
Daily routine reception from a modular telephone, in which is to receive daily routine messages from modular telephones identified by code "TD".
The structure of this reception is as follows:
Heading.
Message code of daily routine.
Modular telephone identification.
Number of message.
Date of sending.
Failure not reported.
Calling pulses (S.E., short-distance, provincial calls, long-distance calls, international calls, test calls).
Call duration (S.E., short-distance, provicial calls, long-distance, international calls, test calls).
Number of call (S.E., short-distance, provincial calls, long-distance calls, international calls, test calls).
Pesetas collected with coins, prepay cards, credit cards
Pesetas collected through operator, coins, prepayment, credit cards.
Counting pulses in coins, prepay cards, credit cards.
Number of calls with coins, prepay cards, credit cards.
Coins (several types).
Cards (several types).
Communication failure with the service for operating public modular telephone.
End of message.
Longitudinal parity.
Daily routine reception from the validation and identification unit.
Daily routine reception from the access unit.
Modular telephone collection.
Modular telephone initialization.
Initialization of the validation and identification unit.
Initialization of the access unit.
Prompt visualization on the modular telephone.
Prompt visualization on the validation and identification unit.
Prompt visualization on the access unit.
Request for activity in a modular telephone.
Answer of activity in a modular telephone.
Replacement of fraudulent meters.
Inventory of plant (total for province, maintenance zone, one locality, a switching center or a validation and identification unit.
Failure management (among which: maintenance, overhauls, actions on pending failures, failure note introduction, frankings and listings.
Collection management, among which: upkeeping of data received through collection messages and daily routine messages, as well as production of total collections reports for provinces, localities and switching centre.
Traffic reports, among which: upkeeping of traffic data received by daily routines sent by different equipments, as well as total traffic for province, locality and switching centre.
Availability and service quality reports, among which: number of failures per number of telephone set and month, time average at failures, mean duration of notices in different elements, percentage of delayed failures, etc.

It is not considered necessary to extend this description for any expert in the art to understand scope of the present invention and the advantages derived from it.

The materials, size, shape and arrangement of its components are open to variation, provided that it does not imply any alteration to the essence of the invention.

The terms under which this specification has been described should be taken in an ample and not limitative sense.

We claim:

1. A system for operating public modular telephones comprising:
(1) a plurality of modular telephones;
(2) validation and identification units;
(3) access units;
(4) regional billing centers;
(5) a validation and billing center;
(6) terminals of collecting entities;

(7) a message concentrator unit in communication with each of the above elements (1)-(6), the message concentrator unit including means for interchanging diverse specific operating messages therewith;

(8) a center operating unit, connected to the message concentrator unit;

(9) a plurality of visual displays and printers in communication with the center operating unit; and

(10) information storage devices having system operating and management software, in communication with the message concentrator unit.

2. The system of claim 1, wherein the center operating unit includes:

means for controlling the message concentrator unit by using it as a front end;

means for managing diverse visual displays for the system operator; and means for maintaining failure consultation and management sessions using auxiliary displays and printers for senders.

3. The system of claim 1, further comprising:

a set of parameter tables to teleprogram plant elements and their subsequent supervision and control.

4. The system of claim 1, wherein the system further comprises:

means for controlling maintenance of the modular telephones in real time;

means for sending and receiving messages in diverse situations; and means for providing direct communication between senders and an attendant in charge of failures at the time of repair.

5. The system of claim 1, wherein:

the operating and management software includes a large number of maintenance functions, situation reports on plant elements, traffic statistics, failure and repair control starting from daily routine data in accordance with programmable thresholds, providing information regarding plant status, plant composition, service quality and terminal reliability.

* * * * *